United States Patent [19]

Knaudt

[11] Patent Number: 4,542,966
[45] Date of Patent: Sep. 24, 1985

[54] SHOULDER-HAND SUPPORT FOR PHOTOGRAPHIC APPARATUS

[76] Inventor: Hermann Knaudt, Drosselweg 24, 85 Nürnberg 30, Fed. Rep. of Germany

[21] Appl. No.: 585,785

[22] Filed: Mar. 2, 1984

[30] Foreign Application Priority Data

Mar. 10, 1983 [DE] Fed. Rep. of Germany ....... 3308509

[51] Int. Cl.[4] .............................................. G03B 17/00
[52] U.S. Cl. ..................... 354/82; 354/266; 354/293; 248/187
[58] Field of Search .................. 354/81, 82, 293, 266, 354/173.1; 352/243; 248/187

[56] References Cited

U.S. PATENT DOCUMENTS

| 2,552,205 | 5/1951 | Moss | 354/82 |
| 2,806,416 | 9/1957 | Jones | 354/82 |
| 2,926,591 | 3/1960 | Huffman | 354/82 |
| 3,002,663 | 10/1961 | Fernelius | 354/82 |
| 4,437,753 | 3/1984 | Dunn | 354/293 |

Primary Examiner—A. A. Mathews
Attorney, Agent, or Firm—Arthur B. Colvin

[57] ABSTRACT

A shoulder support for a camera is disclosed, said support being shiftable from a compact stowed condition to an extended operational condition. The device includes a shoulder brace component and a camera support component which are rotatable 90° relative to each axis about the longitudinal axis of the camera support component. A grip member pivotally mounted to the camera support component includes operating keys for winding the camera and tripping the shutter release, the connections between the camera and operating keys are located substantially entirely internally of the device.

11 Claims, 31 Drawing Figures

Section I-I

Fig. 21

Section V-V

Fig. 26

SHOULDER-HAND SUPPORT FOR PHOTOGRAPHIC APPARATUS

BACKGROUND OF THE INVENTION

The invention concerns a shoulder-hand support for photographic apparatus with a holding fixture which is positioned on a supporting arm connected, on the one side to a grip and, on the other side, to a brace rod, whereby the second end of the brace rod is connected to a folding shoulder brace and whereby the grip has a key which has a releasing connection to the apparatus.

PRIOR ART

Devices of the general type described have, for example, already become known through GM No. 79 18 069. These devices have, however, the disadvantages that they are still too unsteady and too unwieldy in operation. A rapid picture sequence can not be effected with these devices as the left hand must constantly go to and from between the lens adjustment and the film-transport lever on the camera. This is especially complicated because the lever for the film-transport on the camera is always on the right. It is thus out of reach of the left hand when using such supports. Therefore such supports can only be used efficiently when the camera possesses a motor-driven film-transport.

The release key on the grip is usually connected to the release on the camera by means of a so-called cable release. Apart from the awkwardness of the cable release there is also the danger when the support is folded that the camera held ready for operation is released by accident due to light pressure on the release key.

Known camera supports are disadvantageous in that the camera is held to the support by a bolt received in a threaded receptacle on the camera. This kind of attachment can be dangerous when the camera is swivelled 90° to take upright-format pictures as the centre of mass of the whole photographic apparatus does not go exactly through the thread axis and it can thus come undone from the thread.

SUMMARY OF THE INVENTION

In order to overcome the above-mentioned disadvantages it is an object of the invention to provide a support of the kind described, which allows a safe camera guidance for horizontal and vertical formats, as well as a simple operation of the camera without other aids and which can be stowed in the smallest possible space, and at the same time be ready for operation quickly.

The problems of prior art device have been solved by the invention in that the holding fixture consists, in the main, of a holder with a positive locking adapter positioned on a supporting arm. The connection on the supporting arm is formed by quickly connectable swivel joints having a single swivel axis. The connection on the shoulder brace is formed as a joint with two swivel axes which are at right angles to each other, whereby the supporting arm is positioned on the left next to the supporting arm and there is at least one further key on the grip for the film-transport. Thus the transmission links of all key signals are, in the main, arranged on the inside of the support and on the holding fixture. A support of such kind can be unfolded and folded very quickly because of the quickly unlocking swivel joints and is, in its unfolded state, very rigid which enables a smooth and sure camera guidance. The special kind of jointed arrangement of the shoulder brace allows and easy and safe handling of vertical camera guidance, whereby the positive locking adapter for the camera in the holder positioned on the supporting arm the rapid change of which and absolute stability also in vertical position is assured. The use of threaded elements for detachment is neither necessary nor possible.

As the key for the shutter release as well as a key for the film-transport are provided on the grip of the shoulder-hand support, it is unnecessary to manipulate the film transport lever or shutter release on the camera. Shutter release and film-transport are possible using one hand and in rapid sequence. Since the transmission links for the release and the film-transport are arranged on the inside of the shoulder-hand support and in the holding fixture for the camera, additional dangerous parts, e.g. the cable release, are no longer necessary. The special arrangement of the supporting arm, which is ready for operation on the left of the brace rod (and not, as is usual, over it) means that the viewfinder of the camera has a suitable position for the eye of the photographer whereby uncomfortable and tiring positions of the head can be avoided. The device has the additional advantage of being foldable to provide a compact unit when not in use.

In an embodiment of the invention the adapter should at least have an operating mechanism which is, on the one hand, connected mechanically and/or electro-magnetically to the release for the apparatus and, on the other hand, to the key for the release on the grip. Hereby the adapter becomes, as it were, an "interface" between camera and support and can therefore be adapted to specific features of each camera.

In a further embodiment of the invention the adapter has an operating mechanism which is, on the one hand, connected to the film-transport system of the camera, and, on the other hand, to the further key on the grip. As an advantage the adapter hereby becomes, at the same time, an "interface" between camera and support for the film-transport system of the camera.

In another development of the invention the adapter is formed as a rectangular box section approximately the length of the camera width, on the top side of which the camera can be fixed. A spring-returnable rotating joint is provided on the inside of the box section and connected to the transport device of the camera, which is connected to a sliding part by a flexible pulling device. The pulling device has itself an operative connection over an opening through a slot on the bottom side of the adapter to an operating lever positioned in the support on the one hand, and to an arm of an angle lever positioned on the inside of the box section, on the other hand. Thus the second arm of the angle lever operates a release. This is a favourable design of the adapter to assure a safe functioning, simple construction, to release the camera and to operate the film-transport system of the camera. A single operating lever which enters the adapter through a simple slot is enough to fulfil all necessary functions.

In an advantageous embodiment of the invention the operating lever is attached to a swivel axis rotatably and axially slidable in the supporting arm, on the grip side of which a further operating lever is fixed which juts through corresponding openings in the grip and which is there swivelled by the key for the film-transport and slid axially by the key for the release. This is an especially simple mechanical possibility of transmitting all functions. This simple mechanical construction leads to the greatest possible reliability and least wear and tear. At the same time the production-engineering expense is minimized, whereby the whole costs can be kept low.

In a further embodiment of the invention the swivelling and sliding movement takes place against the preload of a spring, whereby the return to the starting position is reached in the easiest possible way.

In a further development of the invention the key for the film-transport can be reached and guided by a thumb extending through a longitudinal slit on the side of the grip, and there in a longitudinal guidance and brought into an operative connection with an operating lever by a driver. This kind of guidance and the direction of movement of the key for the film-transport on the grip is favourable for the movement capabilities of a human thumb in its position and its direction of movement and is thus economically favourably designed. Hereby the necessary connection with the operating lever is very simply constructed.

In a further embodiment of the invention the key for the release is connected as a push key for operation by an index finger on the inside of the grip to an operating strip abutting onto the operating lever. In this manner the operating lever can be operated safely by the push key for the release in every possible angular position, without the push key being overloaded in an unfavourable direction.

In a supplementary development of the invention it is suggested that the operating strip is formed as a movable mounting swivelling about an axis parallel to the plane of the swivelling movement of the operating lever. This is a particularly simple and functioning development of the operating strip. At the same time this kind of development to a movable mounting enables the path for the push key to the release to be adjusted to a suitable or desired magnitude so that the shutter release can be made more or less sensitive.

Again in a development of the invention the grip is formed as a rectangular box section and positioned swivelling as a swivel axis in corresponding bearing bores of the supporting arm by a joint bolt positioned on the box section and locked in operating position by a second spring-preloaded locking bolt in the supporting arm sliding parallel to the joint bolt which snaps into a corresponding bore of the grip. This kind of construction of the grip enables the use of semi-finished sections whereby the production costs can be kept low. At the same time this construction enables a safe positioning of the joint bolt for the swivel movement so that a simply formed but at the same time a longlasting and rigid joint connection for swivelling about an axis can be made. A locking action in the operating position creates a rigid system between grip and supporting arm. As the locking bolt is spring-preloaded it snaps independently into the corresponding locking bore and is securely held there.

In a supplementary development of the invention the locking bolt snaps into a locking centering detent in a corresponding place on the side of the grip, after the grip has been swivelled approximately 90°. Hereby one can achieve the locking in the folded position with the same locking bolt. A brief releasing of the locking bolt allows the simple swivelling of the grip in the other direction whereby, when the other direction is reached, the locking bolt snaps in to position automatically.

In another embodiment of the invention the supporting arm and brace rod are formed as rectangular or square box sections and connected to each other by a joint bolt swivelling about the swivel axis parallel to the joint bolt of the grip, whereby both parts are locked in operatig position by a spring-preloaded locking bolt sliding parallel to the joint bolt which snaps into a corresponding bore. Here also the use of semi-finished sections allows favourable production costs and, at the same time, provides safe and rigid joint connections. The spring-preloaded locking bolt ensures a rigid locking in operating position which can, in addition, be quickly locked and unlocked.

In a supplementary embodiment of the invention there is an opening in the supporting arm and above the locking bolt which is covered by a sliding plate connected to the locking bolt by a junction element. This is a particularly simple and smallconstruction possibility for a manual operation of the locking bolt on the grip.

Concerning another joint it is suggested in a development of the invention that the locking bolt juts out with a head under which a plate grips positioned parallel to the brace rod, which juts out freely with a grip strip and which slides the locking bolt when the grip strip is operated. This kind of operation can be constructed very flat so that, in this area also, parts which jut out unnecessarily are avoided.

In another development of the invention it is suggested that the second end of the brace rod is forked and the remaining side walls support a swivel axis on which a swivel element is positioned rotating with two sides at right angles to each other and a connecting circular arc part, whereby the circular arc part has two cavities staggered 90° from each other in which a spring-preloaded positioning piece positioned sliding in the brace rod can snap and, whereby the swivel element supports a swivel axis for the shoulder brace at right angles to one side and to the axis for the swivel element. Hereby the desired flexibility and swivelling for the shoulder brace is achieved in a simple way. the cavities and the spring-preloaded positioning parts ensure a locking in the shoulder brace in the desired position.

In a supplementary development of the invention the shoulder brace consists, in the main, of holders which are connected at one end folding 90°, and the second ends of which are connected by a flexible band, whereby the one holder is positioned swivelling on the swivel axis for the shoulder brace. Hereby the design of a folding shoulder brace is achieved which cannot fold in the case of firm leaning on the shoulder and thus slip and yet still has the desired flexibility in its construction.

In a further development of the invention the holder consists, in the main, of a ground plate positioned on the supporting arm and with a slot for the operating lever, the back side of which has two claws pointing forwards at a distance from the ground plate, which snap into corresponding fixation openings of the adapter, whereby, on the opposite side, a lock in a stop casing ensures the necessary axial fixation and holding down of the adapter. This is a particularly simple and functional construction of the holder which assures a safe fixation of the adapter and its quick replaceability.

In a supplementary development of the invention the lock is spring-preloaded and can be unlocked by a tilting lever. In such a way an operation of the lock when the adapter is locked is not necessary. The adapter must simply be put in the claws with its fixation openings and tipped forward, whereby the lock is first pushed back and then snaps in due to the spring-preload.

In a further supplementary development of the invention the ground plate has a positioning bolt which snaps into a corresponding bore in the adapter. This positioning bolt ensures an exact positioning of the adapter on the ground plate and thus for a corresponding exact positioning of the camera. At the same time all transmitting elements are exactly positioned during the assembly and can thus interfit without the danger of damage.

In a further development of the invention the joint bolt is firmly positioned at a slight inclination in the supporting arm and the corresponding bore in the folded brace rod has the same inclination. In this way the whole support can be so constructed that in its unfolded state the brace rod can be inclined sidewards e.g. for special camera forms.

In a varying development of the invention the connection of brace rod to the supporting arm is formed as a sliding connection. Also a sliding connection on the mentioned place has all desired mechanical and handling advantages. It can also be produced cheaply.

In a development of this in accordance with the invention a sliding sleeve is connected to the supporting arm approximately at the level of the holding fixture and the brace rod in the sliding sleeve is positioned sliding and positive locking in the operating position. This is a mechanically favourable development of the desired sliding connection.

In a further development of the invention a plate is fixed under the supporting arm and the sliding sleeve and connects both parts together whereby the sliding sleeve is positioned on the plate swivelling about a vertical axis. As a result of this development a desired slight inclining of the brace rod can be reached. When this vertical axis is, at the same time, positioned in a suitable way so that it lies inclined then a corresponding desired swivelling movement of the brace rod e.g. sidewards and downwards is possible.

In a further development of the invention the swivelling movement of the sliding sleeve is lockable with a stop. Hereby various swivel positions of the brace rod as well as a desired end position of the brace rod can be locked in a simple way, if a locking of the brace rod by a stop on the supporting arm after reaching the end position is not desired or provided.

Finally in a development of the invention the brace rod is formed as a hollow section in which a profile of the same section form is arranged, which is longitudinally slit over a sufficiently long part whereby a second half of a cross-section is separated and connected folding to the inner profile by a joint belt. This is a particularly favourable construction of a folding shoulder brace which can be slid axially into the brace rod in the folded state and thus does not need any additional space.

The invention is now to be described in more detail with the help of the enclosed figures in which a construction example is shown.

The figures show.

The shoulder-hand support consists, in the main, of a supporting arm 5 (FIG. 1) on the front end of which a grip 6 is attached by a jointed connection 11. There is a key 10 on the grip 6 e.g. for the release of photographic apparatus 2 as well as a key 18 e.g. for the film-transport on apparatus 2. On the other end of the supporting arm 5 of the shoulder-hand support 1 there is a further jointed connection 12 on which a brace rod 7 is connected to the supporting arm 5 and so that the supporting arm 5 is on the left of the brace rod 7 when in operating position. Each of the jointed connections 11 and 12 on the supporting arm 5 has a swivel axis 13 and 14 respectively, whereby grip 6 can be swivelled about horizontal swivel axis 13 and the brace rod 7 can be swivelled about horizontal swivel axis 14.

The second end 8 of the brace rod 7 is forked whereby the remaining side walls of the fork are used as a support for a horizontal swivel axis 16 which serves as a swivel axis for swivel part 59 (see FIG. 8), which has two sides 60 and 61 positioned at right angles to each other and connected to each other at their end by a circular arc piece 62. The circular arc piece 62 has cavities 63 and 64 in which e.g. a spring-preloaded ball can snap in as a stop or locking element. The spring-preloaded ball can be positioned axially sliding inside the brace rod 7.

Figures 5, 6, 7, 8:
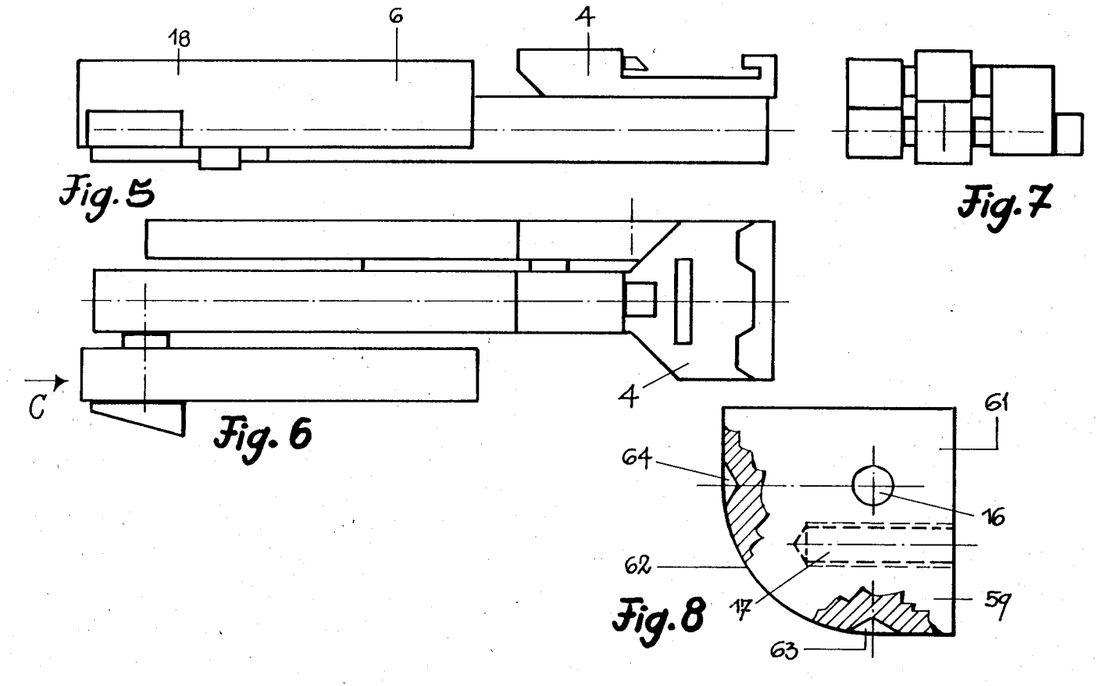
FIG. 5 is a side elevational view of the device of FIG. 1 in folded condition
FIG. 6 is a view of the device as depicted in FIG. 4, in folded condition
FIG. 7 is a view in direction of arrow C in accordance with FIG. 6
FIG. 8 is a magnified vertical section through the area beneath arrow 8 of FIG. 1

A pivot axis 17 is placed in the side 61 opposite the side on which the holder 66 of the shoulder brace 9 is rotatably positioned. The holder 66 is foldably connected to a second holder 65 with a jointed connection 15, whereby the free ends of the holders 65 and 66 are connected by a flexible band 67 which serves as a support for the shoulder. When the holders 65 and 66 are moved towards the shoulder the pressure from the shoulder on the flexible band 67 deflects arms 65, 66 toward each other so that the shoulder is firmly enclosed.

Approximately in the area of the jointed connection 12 on supporting arm 5 there is a holder 4 connected to supporting arm 5 in which an adapter 3 can be put. The adapter 3 is hereby adapted to the connection dimensions and the position of the operating devices on the apparatus 2.

To operate the apparatus 2 in accordance with the construction example the adapter 3 is formed as a rectangular box section 25 (FIG. 15) which supports the apparatus 2 on its top side 27 and which has a length 26 adapted to the apparatus 2. The attachment to the apparatus 2 can be adapted to the possibilities of this said apparatus, e.g., a threaded bolt 89 (FIG. 22) can be provided which is screwed into the support screw thread of the apparatus 2. In this way the apparatus 2 is fixed to the top side 27 of the adapter 3 but it is not secured from coming loose when swivelling. Such a safeguard can be added as desired e.g. by putting in a second screw. However, in the construction example this result flows automatically from the necessary connection of the adapter 3 to the connecting part provided on the bottom side of apparatus 2 for the film-transport.

Figure 20:
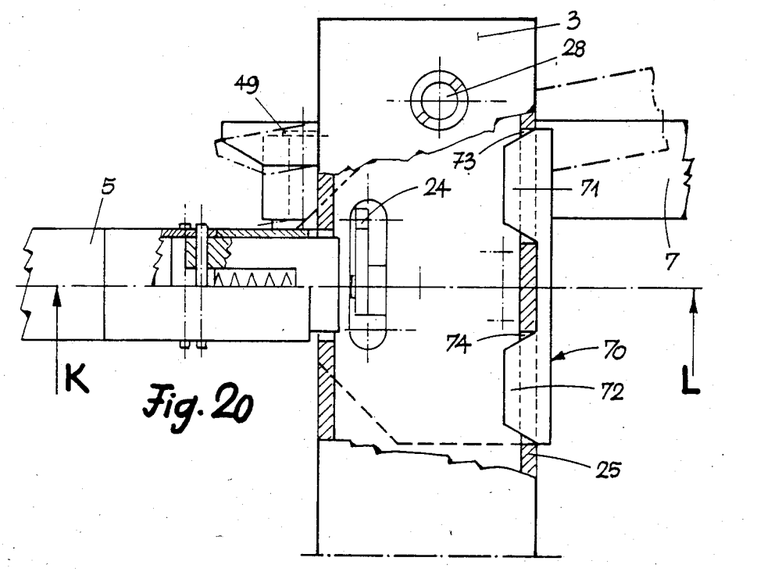
FIG. 20 is a view taken in the direction of arrow D of FIG. 15 with parts sectioned to show details of construction
Figure 24:
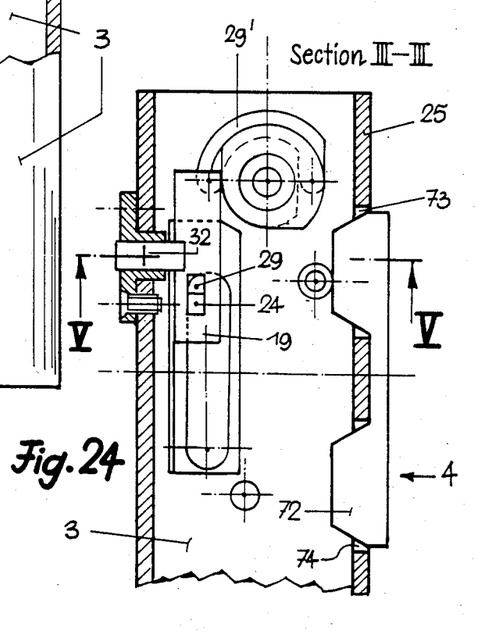
FIG. 24 is a cross-section taken on line III—III of FIG. 26
Figure 25:
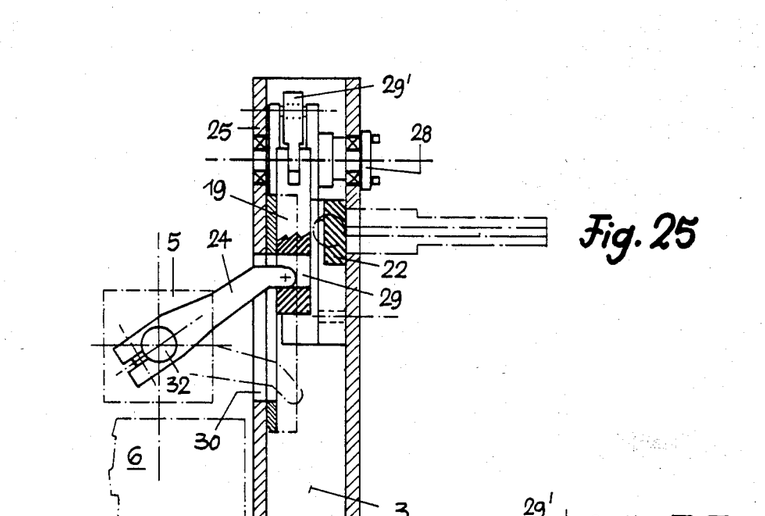
FIG. 25 is a cross-section taken on line IV—IV of FIG. 23

A rotating joint 28 (FIG. 20) positioned in the adapter 3 snaps in this connecting part which hereby sets up the connection with the film-transport system of the camera and which represents a safeguard for the whole apparatus 2, whereby this is safeguarded from coming loose or tilting. The rotating joint 28 is contained by a flexible pulling device 29, (FIGS. 23, 24) inside the adapter 3, one end of which is attached to the rotating joint 28, and the free end of which is attached to a sliding part 19. The sliding part 19 is movable in the longitudinal direction of the adapter 3 and has an opening 29 in which an operating lever 24 (FIG. 16) snaps which is guided inside the adapter 3 through a corresponding slot 30 (FIG. 25).

The sliding part 19 lies with its back side on an angle level 20 whose swivel axis 110 (FIG. 23) lies parallel to the sliding direction of the sliding part 19 so that a sliding movement of the sliding part 19 does not operate the angle lever 20. When the sliding part 19 moves in the longitudinal direction of the adapter 3 then, at the same time, the rotating joint (FIG. 25) is turned by the moving flexible pulling device, which itself operates the film-transport system of apparatus 2 in the desired way. The return to the starting position can take place, depending on the construction form, by a device on the camera or e.g. by a flexible pulling device 29' attached to the rotating joint 28 with a retractable spring which ensures the necessary return to the starting position.

Figure 26:
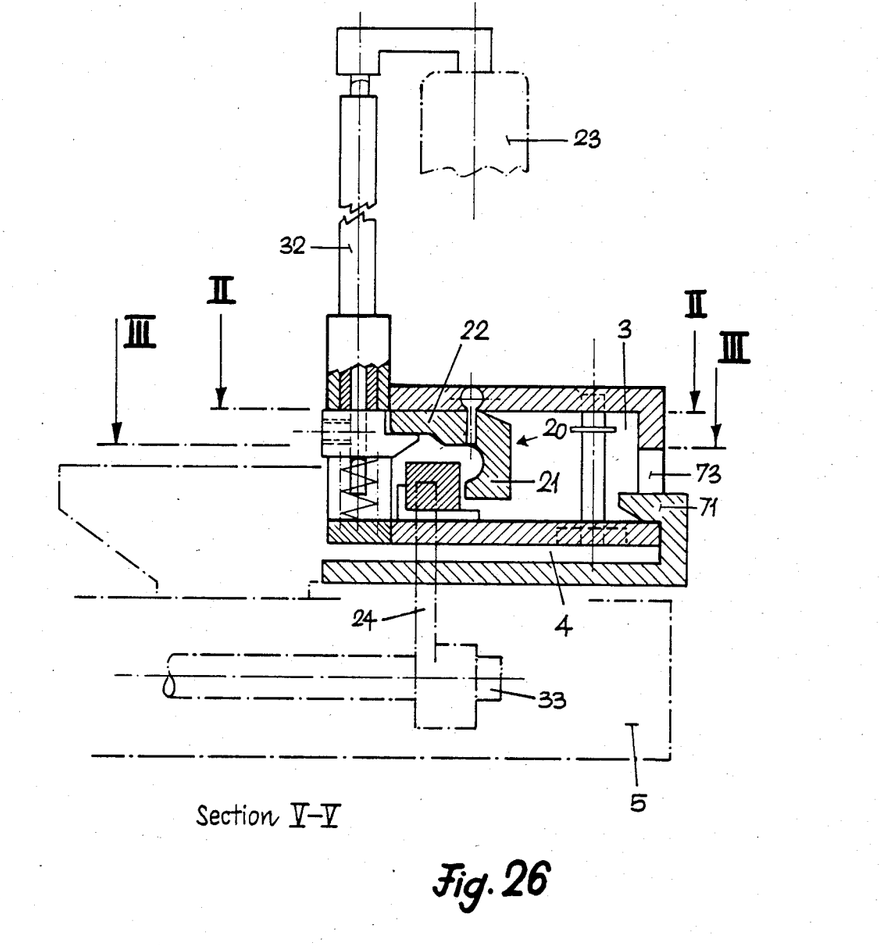
FIG. 26 is a cross-section taken on line V—V of FIG. 24

The angle lever 20 (FIG. 23) is connected to a release mechanism 32 which is itself connected to the release 23 (FIG. 26) on apparatus 2. A tipping movement of the angle lever 20 is transmitted to the release 32 as a longitudinal sliding movement which hereby itself operates the release 23 of the said apparatus. To achieve this the sliding part 19 must be slid vertically to its previously described direction of movement. Also this direction of movement (as to be described later) is effected by the operating level 24. Through such a sliding direction the sliding part 19 presses against the arm 21 of the angle level 20 whereby, as a result of the resulting swivelling about the axis 110 of the angle lever 20, the arm 22 of the angle lever 20 is also operated, which then commences a corresponding sliding movement in the release mechanism 32.

Of course further movement devices for operations can be built into the adapter 3 which are related to the release or to the film-transport as, e.g., an operating key for a data memory on apparatus 2 when such a device is provided on apparatus 2. The necessary releasing movements can all be commenced by the operating lever 24.

Figure 15:
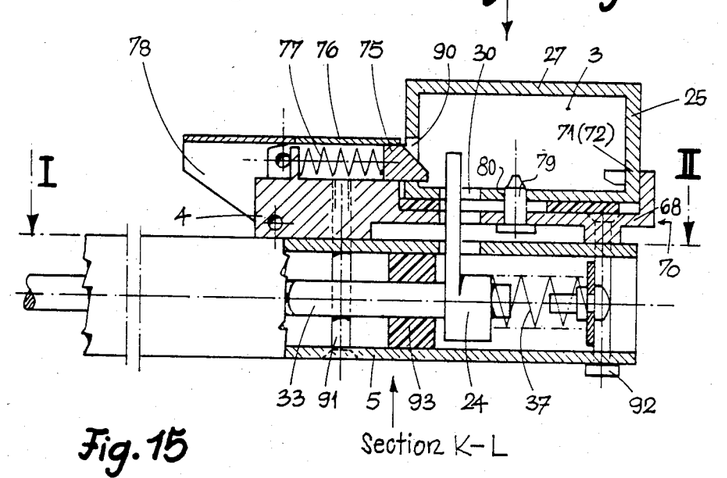
FIG. 15 is a cross-section taken on line K-L of FIG. 20
Figure 16:
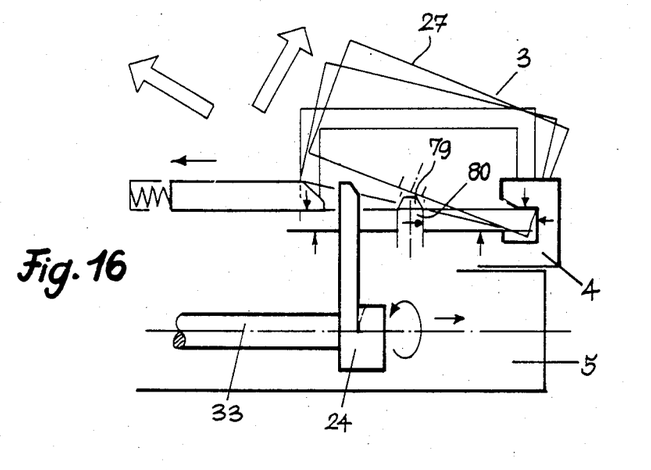
FIG. 16 is a diagrammatic sketch on an enlarged scale of a locking adapter for the support FIG. 17 top view of the grip area of the device

To make a rapid and easy change of cameras possible and yet always achieve the necessary precise relative position of the adapter 3 to the operating lever 24 the adapter 3 in the construction example has fixation openings 73 and 74 (FIG. 20) on its back side. Claws 71 and 72 which are constructed on the back side 70 of the ground plate 68 of the holder 4 snap into these fixation openings 73 and 74. Hereby the first rough fixation is achieved. To achieve an accurate final position a positioning pin (FIG. 16) is provided in the ground plate 68 which snaps into a corresponding bore 80 in the bottom of the rectangular box section 25 of the adapter 3. After putting the claws 71 and 72 in the fixation openings 73 and 74 by inclining and pushing backwards the adapter 3 can be swivelled downwards, whereby the positioning pin 79 snaps into the bore 80 and hereby positions the adapter 3. The rectangular box section has an opening 90 (FIG. 15) on its front side in which a spring 77-preloaded bolt 75, positioned in a stop casing 76, snaps. To separate the adapter 3 from holder 4 it is only necessary to pull the bolt 75 out of the opening 90 with pressure on the tilting lever 78 so that the adapter 3 is simply tipped up on this side and can be pulled forward out of the claws 71 and 72 for separation, as schematically shown in FIG. 16. The holder 4 itself with the ground plate 68 positioned on it can be fixed on the supporting arm 5 with screws 91 and 92 (FIG. 15).

Figures 9, 10, 11, 12:
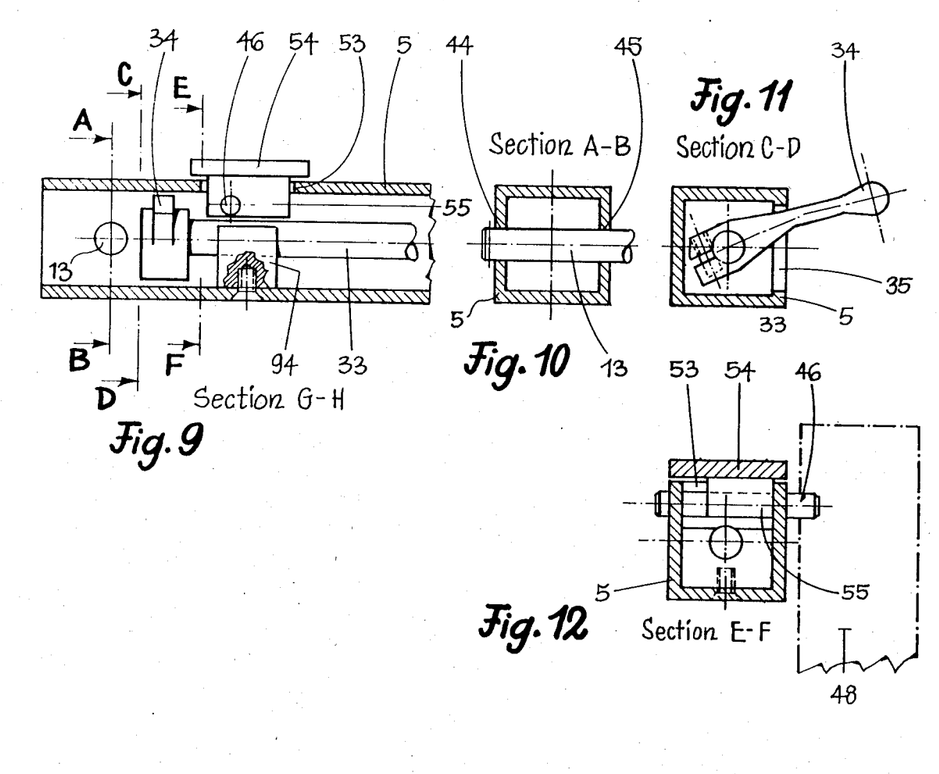
FIG. 9 is a cross-section taken on line G-H of FIG. 17
FIG. 10 is a cross-section taken on line A-B of FIG. 9
FIG. 11 is a cross section taken on line C-D of FIG. 9
FIG. 12 is a cross-section taken on line E-F of FIG. 9
Figure 13:
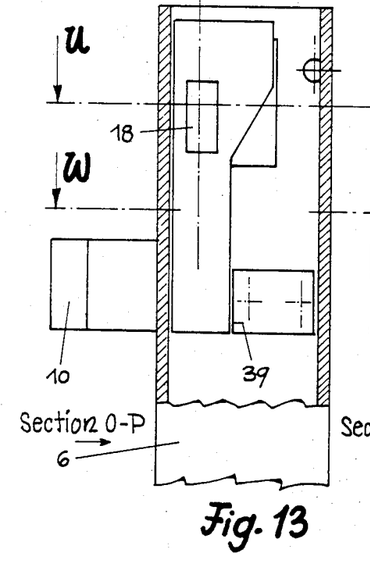
FIG. 13 is a cross-section taken on line O-P of FIG. 17
Figure 14:
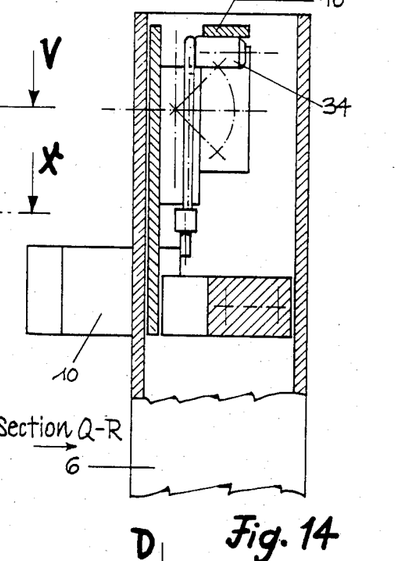
FIG. 14 is a cross-section taken on line Q-R of FIG. 18
Figure 19:
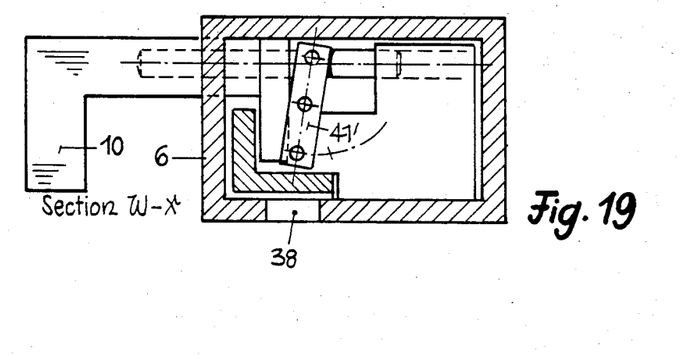
FIG. 19 is a cross-section taken on line W-X of FIG. 13

The operating lever 24, which effects all movements in the adapter 3 is fixed inside the supporting arm 5 on a rotating and axially sliding swivel axis or operating shaft 33 (FIG. 15) which is positioned in bearing elements 93 and 94. The second end of the swivel axis 33 is hereby connected in torsion-transmitting relation to a further operating lever 34 (FIG. 11) which juts over the opening 36 in the side wall 48 and the opening 35 in the supporting arm 5. The side wall opposite the side wall 48 of the grip 6 has a longitudinal slit 38 in which a key 18 (FIG. 19) is guided inside and for the film-transport on apparatus 2 along the longitudinal guidance 39 in the grip 6 in its sliding movement. The key 18 is hereby connected to a driver 40 which abuts on the end of the operating lever 34 and shifts the same when the driver is slid. When, for example, the key 18 is moved down by a human thumb then hereby the operating lever 34 is swivelled by the driver 40 and thus also the swivel axis 33 and further the operating lever 24. Hereby the operating lever 24 causes the already described sliding of the sliding part 19 with the described results.

Figures 22, 23:
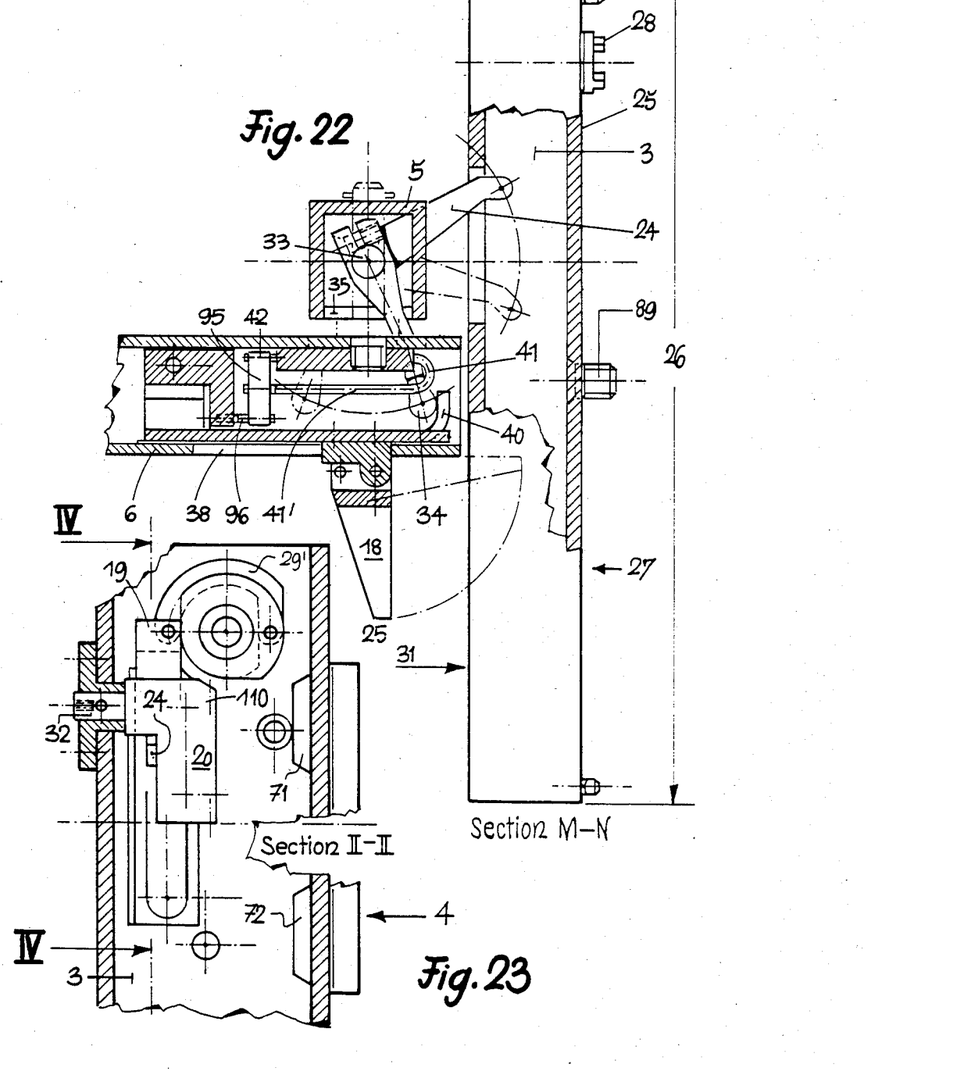
FIG. 22 is a cross-section taken on line M-N of FIG. 17
FIG. 23 is a cross-section taken on line II—II of FIG. 26

On its narrow side (FIG. 19) the grip 6 has a key 10 which is guided inside. This can be guided axially sliding on a simple guide pin or in another suitable way. There is also an operating strip 41 formed as a bow in the grip 6 which is positioned so that is swivels about an axis 42 (FIG. 22). Further a contact piece 95 can be provided swivelling about the axis 42 which can abut on the second arm 41' of the operating 41. The contact piece 95 can be operated by the key 10 on its free end whereby, as a result of the movement of the contact piece 95, the operating strip 41 is swivelled about its axis 42. The second arm 41' of the operating strip 1 abuts on the operating lever 34 so that, as a result of the swivelling movement of the operating strip 41, the operating lever 34 and thus the swivel axis 33 are slid axially. This axial sliding movement takes place against the preload of the spring 37 (FIG. 15) which is positioned as a spiral pressure spring on the side of the supporting arm 5 where the holders are. Hereby the spiral pressure spring 37 can, at the same time, be so constructed that it also effects the returning of the swivelling movement of the swivel axis 33 as very little force is necessary. Of course an independent spring element can be provided for the return of the swivelling movement.

A stop 96 on the contact piece 95 ensures that the key 10 for the release cannot be pushed in too far, whereby key 10 can also abut onto the stop 96 as in the construction example.

To make the jointed connection 11 of the grip 6 with the supporting arm 5 the grip 6 is attached to the free end of a joint bolt 43 (FIG. 19) extending through side wall 48. The joint bolt 43 is positioned swivelling in corresponding bearing bores 44 and 45 in the supporting arm 5 and secured as required from axially sliding out. the general arrangement is hereby that the grip 6 is positioned next to the supporting arm 5 and not below it.

This arrangement ensures a simple set up and a smooth handling of the whole support 1 in relation to the brace rod 7 positioned on the other side next to the supporting arm 5. As the supporting arm 5 is positioned between the grip 6 and the brace rod 7 a positioning of the apparatus 2 is reached which is safe from tipping and smoothly and simply handled. At the same time this arrangement provides a favourable positioning of the photographic apparatus 2 for the eye of the operator, in addition to a simple setting up and folding up in to the smallest possible space as all elements can be laid next to each other.

Figure 1:
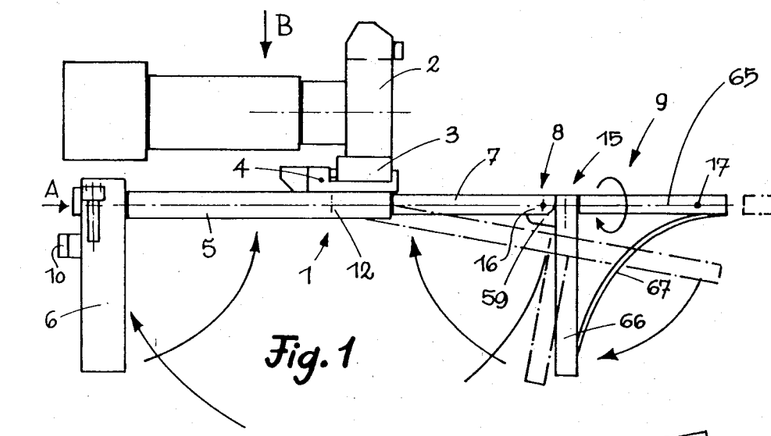
FIG. 1 is a side elevational view of the support in operating position
Figure 2:
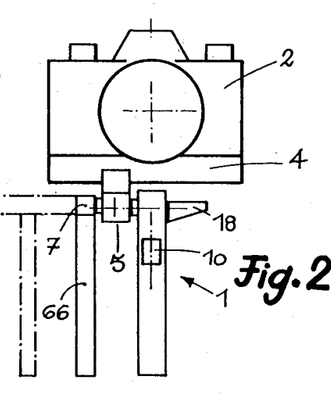
FIG. 2 is a front elevational view in direction of arrow A of the device of FIG. 1
Figure 17:
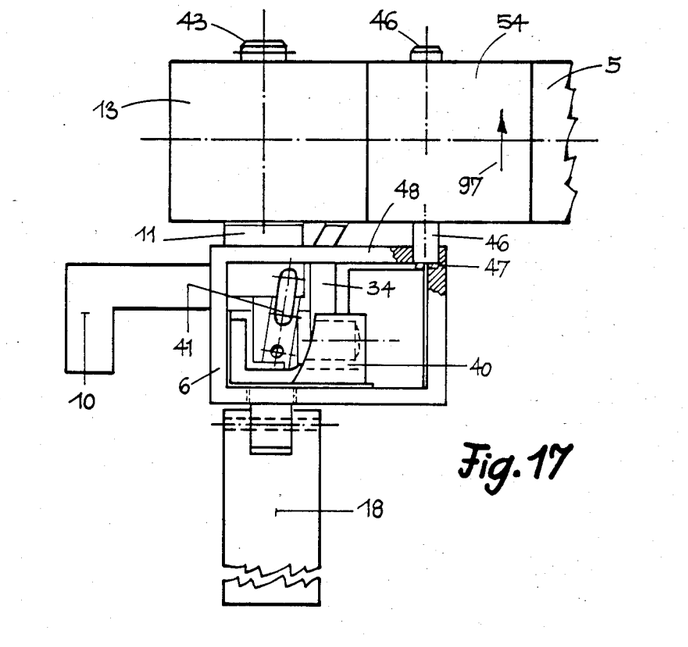
Figure 18:
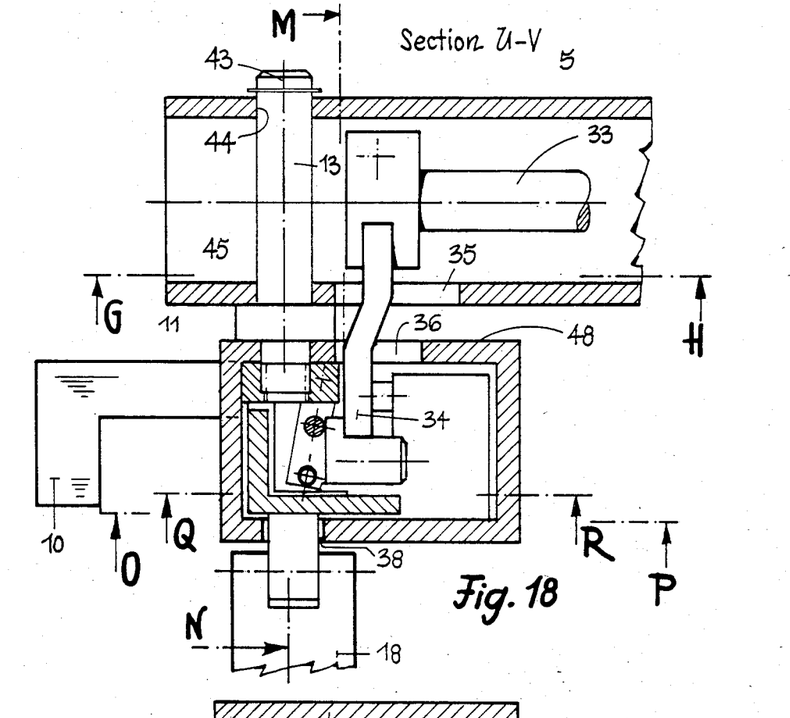
FIG. 18 is a cross section taken on line U-V of FIG. 13

To lock the grip 6, e.g. in the position shown in FIG. 1 the supporting arm 5 has an opening 53 (FIG. 9) on its top side just behind the joint bolt 43 which is covered by a sliding plate 54 which has a junction element or detent 55 on its bottom side. This junction element 55 supports a locking bolt 46 positioned parallel to the swivel axis 13 of the joint bolt 43. The locking bolt 46 juts laterally over the supporting arm 5 and snaps with this piece jutting out into a bore 47 (FIG. 17) in the side wall 48 of the grip 6. In this position the grip 6 is locked rigidly and securely from any kind of swivelling. A sliding of the sliding plate 54 in the direction of the arrow 97 (FIG. 17) pulls the locking bolt 46 out of the bore 47 so that the grip 6 can be folded, as indicated by the arrow in FIG. 1, so that it lies parallel to the supporting arm 5 when folded. This position is shown in the FIGS. 5, 6 and 7. Also in this position a second bore in the side wall 48 of the grip 6 corresponding to bore 47 can be provided so that also this position of the grip 6 is lockable. Hereby it is, of course, also possible to hold the locking bolt 46 in the locking direction by a spring-preload.

Figure 21:
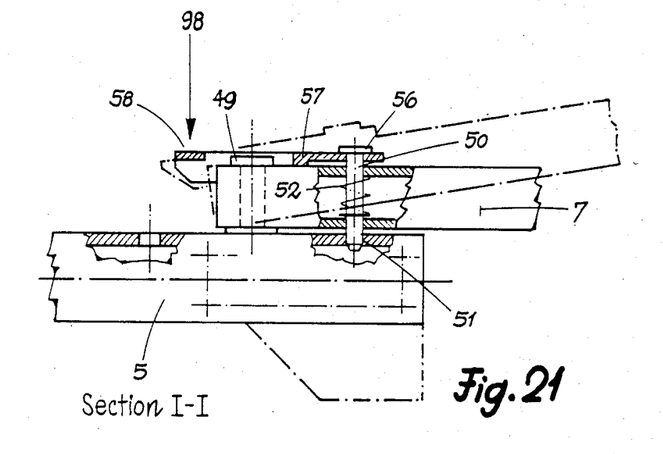
FIG. 21 is a cross-section taken on line I—I of FIG. 15

The brace rod 7 is positioned swivelling on the supporting arm 5 in a similar way to the grip 6. The joint bolt 49 necessary for this is rigidly fixed in the supporting arm 5 and the brace rod 7 positioned swivelling on the joint bolt 49 (as shown in FIG. 21) whereby any kind of safeguard can be used to prevent lateral removal. The brace rod 7 is locked in the operating position by a locking bolt 50 slidably mounted in the rod for movement parallel to the axis of the joint bolt 49. Thus locking bolt 50 snaps into a corresponding bore 51 in the supporting arm 5 and is releasably retained in this position, under the pre-load of a spring 52.

Figure 4:
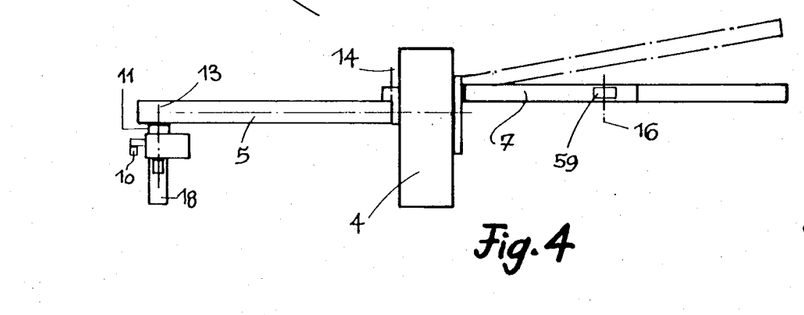
FIG. 4 is a view of the device of FIG. 1 taken in direction of arrow B of FIG. 1

The locking bolt has a head 56 on its outside under which a plate 57 snaps which has a grip strip 58 jutting out. When this grip strip 58 is operated in the direction of arrow 98 then the locking bolt 50 is raised against the force of the spring 52 whereby the supporting arm 5 and brace rod 7 are unlocked. The supporting arm 5 and brace rod 7 can now be folded and laid parallel next to each other. The plate 57 with the grip strip 58 hardly project from the member 7 because of their flat construction. It would also be possible to position the joint bolt 49 inclining in both the supporting arm 5 and the brace rod 7 in the folded state. Hereby the brace rod 7 has an inclined position in the unfolded state dependent on the inclined position of the joint bolt 49, as shown in FIGS. 4 and 21 (dotted lines). If the inclined position of the joint bolt 49 is not just effected in one plane but in two planes angularly offset from each other, thus spatially, then it is possible that the brace rod 7 is not only laterally inclined but also inclined downwards when swung out in the unfolded state, as shown in FIG. 1 (dotted lines). Such an arrangement of the brace rod 7 can be advantageous in special cases.

Figure 3:
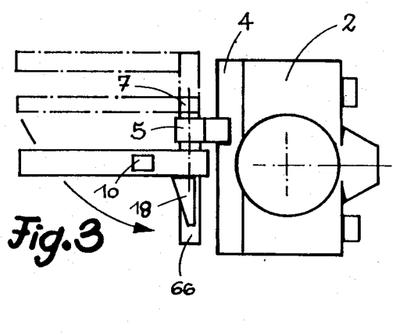
FIG. 3 is a view similar to FIG. 2, with the device swivelled 90°

Also the shoulder brace 9 has a particularly advantageous flexibility and folds. The brace rod 7 is slit on its free end and has a swivel axis 16 supported on the remaining walls. A swivel element 59 is positioned rotating on this swivel axis 16, as previously described. The holders 65 and 66 of the shoulder brace 9 can be put together and in this state can be laid on the brace rod 7 by swivelling the swivel element 59 about the swivel axis 16. In operating position the shoulder brace 9 can be swivelled about the horizontal swivel axis 17, as shown in FIG. 3, so that there are no problems taking vertical views with the same stable position of the shoulder brace.

Figures 27, 28, 29, 30, 31:
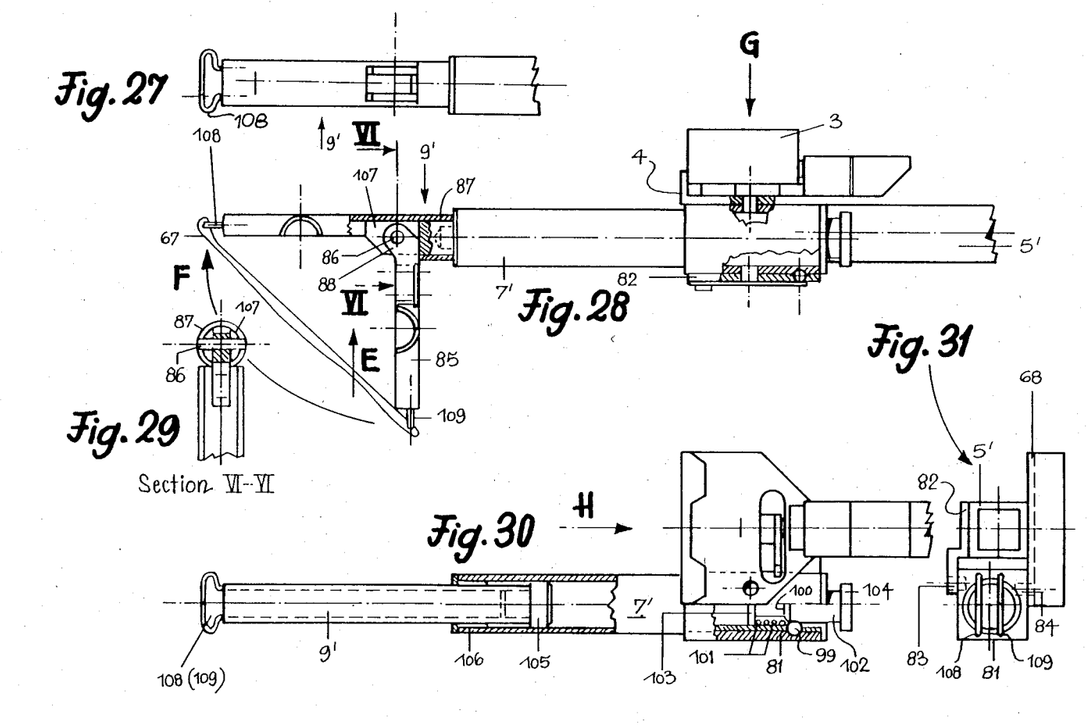
FIG. 27 is a fragmentary view taken in the direction of arrow E of FIG. 28 after swivelling in direction of arrow F in FIG. 28
FIG. 28 is a variant of a support in accordance with FIG. 1 swivelled 180°
FIG. 29 is a cross-section taken on line VI—VI of FIG. 28
FIG. 30 is a view in direction of arrow G in accordance with FIG. 28 with parts sectioned to show details of construction
FIG. 31 is a view in direction of arrow H of a device in accordance with FIG. 30

An alternative embodiment of the brace rod is shown in FIGS. 27 to 31. In this embodiment the supporting arm 5' has a plate 82 on the end with the adapter which is positioned on the side of the supporting arm 5' opposite the side with the adapter—thus down. Otherwise the supporting arm 5' is identical to described supporting arm 5. A sliding sleeve 81 is positioned on the plate 82 in the operating position on the right side next to the supporting arm 5' which can have a square section outside and which can be positioned swivelling about the vertical axis 83 on the plate 82. To create a spatial inclined swivelling of the sliding sleeve 81 it is also possible to provide a second vertical axis 84 in the ground plate 68 to position the sliding sleeve 81 which is correspondingly laterally staggered in relation to the vertical axis 83, as shown in FIG. 31.

The sliding sleeve 81 can be so formed inside for the sliding support of brace rod 7' with a circular arc section. The brace rod 7' with a circular arc section can be formed as a tube. To lock the brace rod 7' in the operating position (FIG. 30) cavities or openings can be provided in the sliding sleeve 81 in which balls 99 can snap without falling through. There is a cage placed in the end of the brace rod 7' on the side of the sliding sleeve 81 which carries such balls and separates them from each other. A sliding supporting pin 102 is placed in the cage the pin having a groove 100 to receive the balls 99.

The supporting pin 102 has a collar 103 on its inner end, on which a spiral pressure spring 101 is supported and which bears with its second side against the cage (not designated further) for the balls 99. Hereby the supporting pin 102 is always weighted by the spring 101 so that the balls 99 are caught in the openings provided for them in the brace rod 7'. The brace rod 7' is thus safely locked in the sliding sleeve 81. The collar 104 stops the supporting pin 102 being pulled too far by the spring 101. However, the kind of locking does not matter. It is just as possible to have a simple cross bolt as a lock for the brace rod 7' in the sliding sleeve 81.

Inside the brace rod 7' formed as a tube a further tube from its second end is positioned sliding which forms the shoulder brace 9'. This shoulder brace 9' formed as a tube has a plate on its inner end 105 which when slid into the brace rod 7' has contact with the collar 103 and when slid further can slide the supporting pin 102 against the force of the spring 101. Hereby the above described locking provided by pin 102 is released.

In the pulled-out operating position the collar 105 bears against the inside of a sliding sleeve 106 which is positioned in the brace rod 7' so as to prevent brace 9' from falling clear of rod 7'.

The brace rod 7' and shoulder brace 9' do not have to have circular arc sections. It is, however, important that the profile 87 of the shoulder brace 9' corresponds to the profile of the brace rod 7'. It is also not necessary for the shoulder brace 9' to be tubular in the construction example. It can just as well consist of solid material with a circular arc section (Because of the cross-section of the brace rod 7').

The tubular shoulder brace 9' (in accordance with the described embodiment) is slit in a centre plane of the profile from its second end and the second half of the cross-section is separated on the end of the slit. This second half of a cross-section 85 is now attached to a joint element 88, as shown in FIGS. 28 and 29, whereby the joint element 88 is positioned swivelling in a corresponding counterpart 107 (positioned in the shoulder brace 9') by means of the joint bolt 86. Each of the free ends of the shoulder brace 9' have bows or eyes 108 and 109 respectively which in their turn can be connected together with the flexible band 67 to made a shoulder support. It is now possible to fold the second half of a cross-section 85 in the direction of the arrow F (FIG. 28) and then, in this folded state, to slide the shoulder brace 9' in the brace rod 7' and, as previously noted, to simultaneously release the locking of the brace rod 7' which can, in its turn, be slid into the sliding sleeve 81 parallel to the supporting arm 5' and thus laid next to this. This is then the same arrangement as in the folding mechanism already described.

In accordance with the described embodiments the signals of the release key 10 and the film-transport key 18 are transmitted to the apparatus 2 over corresponding mechanical units. Such a transmission is, of course, also possible electro-magnectically. Thus, e.g., the sliding part 19 can be formed as the armature of a coil which is switched on by a button provided instead of the key 18. The batteries necessary for this can be easily positioned in the grip 6 or, when necessary, in the supporting arm 5. A push button with a corresponding electrical contact replaces the mechanics for the key 18. The coil switched on pulls in the sliding part 19 formed as an armature and thus effects the desired movement. It is, however, just as possible that a normal electric motor is provided in the apparatus itself, or in the adapter 3 to operate the film-transport system which is switched on by the key 18 resp. the corresponding electric contact, However, as a whole, the mechanical version has the advantage that it is independent of batteries or other power sources.

In accordance with the invention a device is provided which is easy to produce, safe to operate and foldable into the smallest possible space. The special arragement of the individual devices ensures a particularly favourable and thus stable centre of gravity position of a photographic apparatus and thus a safe and easy operation and guidance of the camera. At the same time this special arrangement ensures that the viewfinder is at a comfortable level for the eye of the operator so that tiring positions of the head are avoided. The fixation of the camera itself is safe and guards against accidental release or tipping of the camera when the camera is shifted to the vertical position.

The special construction also ensures that the necessary and most important controls for the camera, namely the shutter release and the film-transport (and when required further controls as, e.g., the operation of the data memory) can be safely guided and controlled with one hand from the grip of the support so that a rapid sequence of pictures is possible with a steady camera position. Extraneous apparatus such as a cable release, is no longer necessary. When the camera is inserted with its adapter it is ready for operation.

As will be apparent to those skilled in the art numerous variations in details of construction may be made to the described apparatus in the light of the preceeding disclosure without departing from the spirit of the invention. Accordingly the same is to be broadly construed within the scope of the appended claims.

Having thus described the invention and illustrated its use, what is claimed as new and is desired to be secured by Letters Patent in the United States is:

1. A shoulder support device for a camera comprising a support arm, camera mount means on said arm for releasably securing a camera thereto, a grip member pivotally secured to said arm adjacent one end thereof, a brace rod member pivotally secured to said arm at the other end thereof, said grip and rod members being disposed to opposite sides of said arm and being foldable about said axis of connection between a stowed position whereat said members lie alongside said arm and an operative position whereat said members extend beyond the ends of said arm, a shoulder brace member connected to the end of said rod remote from the connection of said arm and rod, said shoulder brace member being pivotal relative to said arm about a first axis parallel to the longitudinal axis of said rod and about a second axis perpendicular said longitudinal axis, the combination including key means on said grip and camera actuator means operatively connected between said key means and said camera mount means for actuation of the shutter release and wind mechanisms of a camera on said mount means, said camera actuation means being disposed internally of said grip and said arm.

2. Apparatus is accordance with claim 1 wherein the axis of connection of said grip member and said brace rod are perpendicular to the longitudinal axis of said arm.

3. Apparatus in accordance with claim 1 wherein the axis of connection of said rod to said arm is angularly offset from the longitudinal axis of said arm, whereby in said operative position the longitudinal axis of said rod is angularly offset from the longitudinal axis of said arm, the longitudinal axis of said rod and arm being parallel in said stowed condition.

4. Apparatus in accordance with claim 1 wherein said mount means comprises a holding fixture secured to said arm and an adapter operatively connectable to a camera said fixture and adapter including complemental connector means for non-rotatably securing said adapter to said fixture.

5. Apparatus in accordance with claim 4 wherein said camera mount means includes components of said activator means in said fixture and associated components of said activator means in said adapter.

6. Apparatus in accordance with claim 5 wherein said activator means includes an operating shaft pivotally and axially moveably mounted in said arm, first key means on said grip for imparting pivotal movement to said operating shaft second key means on said grip for imparting axial movement to said shaft, and additional means operatively connecting said shaft and a camera mounted on said adapter for releasing the shutter of said camera or winding said camera selectively responsive to axial or pivotal movement of said shaft respectively.

7. Apparatus in accordance with claim 1 and including spring detent means interposed between said support arm and said brace rod member on the one hand and said grip member on the other hand for releasably locking said grip member and said rod member in said operative position relative to said support arm responsive to movement of said grip member and said brace rod member from said inoperative to said operative position.

8. Apparatus in accordance with claim 1 wherein said shoulder brace member includes a pair of holder members, said holder members having pivotally connected first end portions, and free end portions, a flexable band member connected to each of said free end portions whereby pressure of the shoulder of a user exerted against said band causes said free ends of said holder members to be urged toward each other and into engagement with spaced portions of the shoulder of the user.

9. Apparatus in accordance with claim 1 wherein said support arm and brace rod member are rectangular in transverse section.

10. A shoulder support device for a camera comprising a support arm, camera mount means on said arm for releasably securing a camera thereto, a brace rod having a first end telescopically shiftable relative to said support arm, said rod including a free end, said arm and rod being shiftable between a stowed, nested position and a mutually extended operative position, grip means on said support arm, actuator means on said grip means for triggering a camera on said mount means through shutter release and wind modes, said actuator means including portions extending internally of said support arm and connected to said mount means, a shoulder brace member connected to said free end of said brace rod, said brace member including a pair of pivotal handles shiftable between parallel stowed position and angularly offset operative position, said brace member being pivotal relative to said brace rod about the longitudinal axis of said rod between limit positions offset by 90° whereby a camera disposed on said mount may be supported in two stable positions offset by 90° relative to said shoulder brace member.

11. Apparatus in accordance with claim 10 wherein said handles include free end portions, and a flexible band connecting said free end portions, whereby pressure exerted by the shoulder of a user against said band causes said handles to converge.

* * * * *